April 29, 1952   E. T. BOOTH, JR   2,594,618
THERMAL FLOWMETER
Filed Aug. 11, 1945   3 Sheets-Sheet 1

Inventor
Eugene T. Booth, Jr.

By Robert A. Lavender
Attorney

April 29, 1952  E. T. BOOTH, JR  2,594,618
THERMAL FLOWMETER
Filed Aug. 11, 1945  3 Sheets-Sheet 2
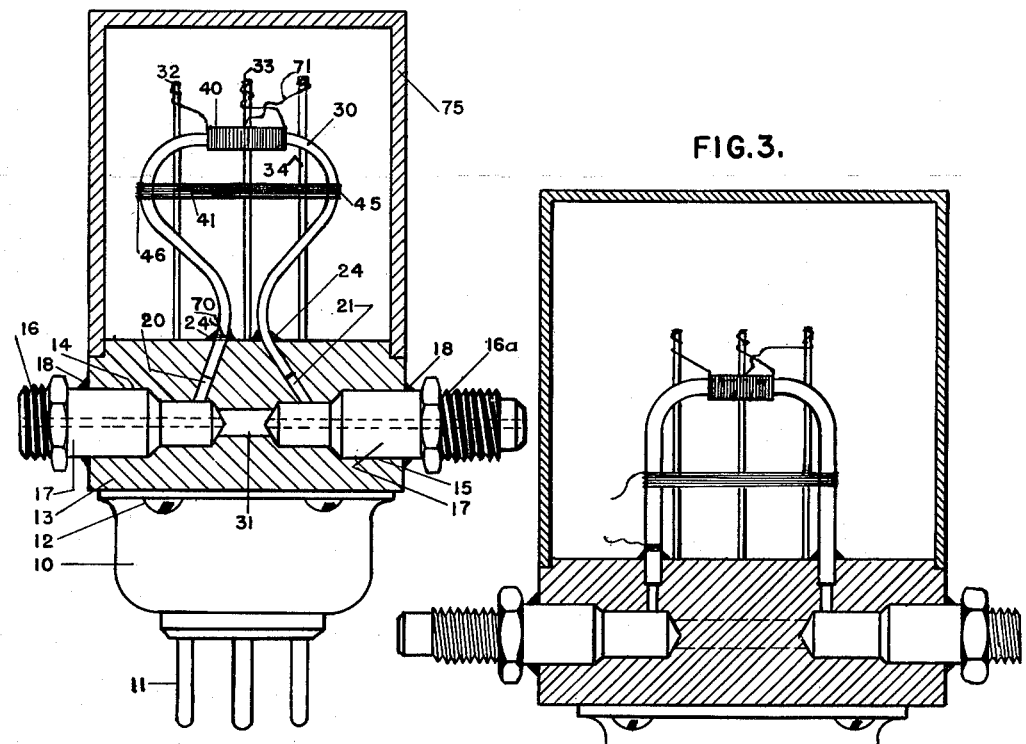
FIG. 2.
FIG. 3.
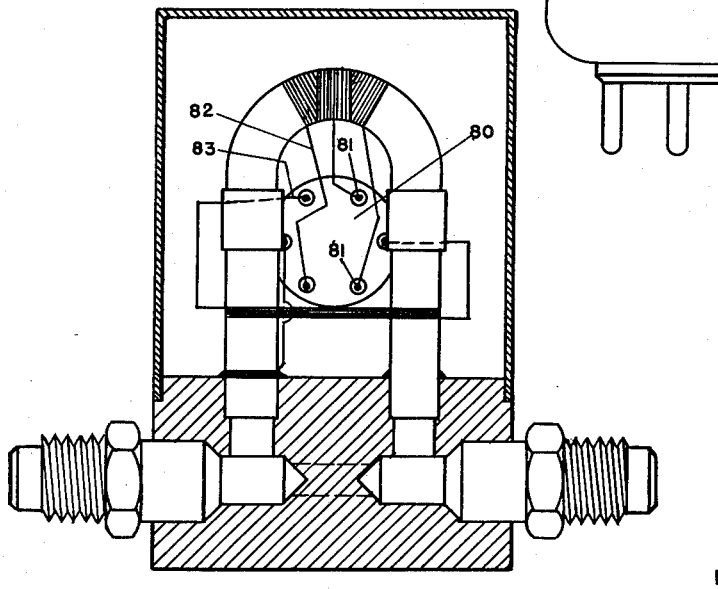
FIG. 4.
*INVENTOR.*
EUGENE T. BOOTH, JR
BY
ATTORNEY April 29, 1952  E. T. BOOTH, JR  2,594,618
THERMAL FLOWMETER Filed Aug. 11, 1945  3 Sheets-Sheet 3

*INVENTOR.*
EUGENE T. BOOTH, JR.
BY
*Robert A. Lavender*
ATTORNEY

Patented Apr. 29, 1952

2,594,618

UNITED STATES PATENT OFFICE 2,594,618

THERMAL FLOWMETER

Eugene T. Booth, Jr., New York, N. Y., assignor to the United States of America as represented by the United States Atomic Energy Commission Application August 11, 1945, Serial No. 610,347

6 Claims. (Cl. 73—204)

This invention relates to an apparatus called a thermal flowmeter that operates by passing a flowing gas through a tube having a heated zone and measuring the temperature rise produced by the heated gas in an unheated zone of the tube. The flowmeter of this invention is very useful for measuring the mass flow rate of small masses of gas flowing at low to medium velocities and will be described in relation to an embodiment satisfactory in such uses, but it is to be understood that this description is merely illustrative and does not constitute a limitation within the natural scope of the invention.

It is an object of this invention to produce a flowmeter that is distinguished by readings that are primarily a function of the mass flow rate rather than the volume flow rate. Another object of the invention is to measure the flow of gases within a tube by measuring the temperature differentials of a locally heated tube through which the gas is flowing. Another object of the invention is to make a flowmeter of high sensitivity, and that may be made so sensitive that it can be calibrated to the flow of particular gases. Another object of the invention is to produce a thermal flowmeter having, in effect, a meter tube, whose inlet and outlet ends are maintained at substantially the same temperature. Another object is to measure a gas flow rate in a main by by-passing a proportion of the gas and measuring the flow in the by-pass. Another object of the invention is to shield a thermal flowmeter to protect it from the effect of external disturbing influences. Other objects of the invention will be in part apparent and in part set forth hereinafter as the description of the invention proceeds.

In the drawings, wherein like numerals refer to like parts, Fig. 1 is a perspective view of a flowmeter embodying the present invention with a part of the shield removed and discloses the conduit loop and certain of the meter parts in place.

Fig. 2 is a vertical sectional view through the meter shown in Fig. 1 illustrating its internal construction, the view being taken before the plane of the loop.

Fig. 3 is a vertical sectional view on a similar plane through a modified form of the invention.

Fig. 4 is a vertical sectional view through another modified form.

Figure 1:
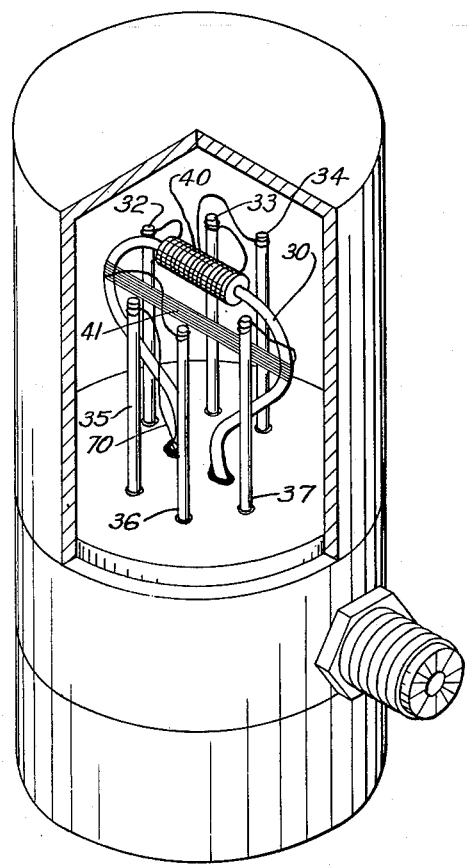

Referring to Figs. 1 and 2, numeral 10 indicates a plug similar to those employed in radio tubes having six projecting contact prongs 11 (only three of which are shown in the drawings) for mounting in jacks providing electrical energy. The plug 10 is mounted by screws 12 on a massive metal base 13 having an inlet 14 and outlet 15 for passage of a gas. Flare fittings 16 and 16a have smooth ends 17 seated in the inlet and outlet holes 14 and 15 and are soldered at the joints 18 to provide a leak-tight joint.

The massive base 13 may be made of any metal having sufficient chemical resistance to the gases which flow through the instrument, but is preferably made of copper because of its very high thermal conductivity and generally satisfactory characteristics. Copper or even brass bases are satisfactory for use with many gases, but for use with particular highly corrosive gases, such as certain metallic fluorides or the contaminants that accompany them, it may be advisable to construct the base of other materials such as Z-nickel. Holes 20 and 21 are formed in the metal of the base in proximity to each other, as shown in Fig. 2, to serve for the mounting of a loop-shaped conduit and to permit the conduit to communicate with the inlet and outlet fittings.

A piece of constantan tubing 30 having an exterior diameter equal to the size of holes 20 and 21 and a wall thickness of about .005 inch is bent to a loop shape as shown in Fig. 2, and the ends are seated in the holes 20 and 21 and soldered at 24 into the massive base. A tube of small diameter, thin-walled, is preferred in order to decrease heat conduction along the tubing. The thermal conductivity of the constantan tubing is about $\frac{1}{20}$ that of copper tubing of the same size. The holes 20 and 21 are inclined and the ends of the tube are flared to conform to the size of the holes. The holes in the base are placed close together so that the ends of the tube will be close together. In this way the massive metal of the base acts to maintain the ends of the tube at a substantially equal temperature.

As so far described, it will be seen that gas can be delivered to the apparatus through a pipe connected to the incoming pipe fitting 16 from whence it will pass through the passage 20, the tube 30, passage 21 and the outgoing fitting 16a. It will be apparent that only small amounts of gas can pass through so small a tube under moderate conditions of pressure. Therefore, if it is desired to handle a larger flow of gas than can be easily done through the tube 30, a shunt 31 is drilled through the base member 13 connecting the holes 14 and 15 as shown in Fig. 2. In the construction shown, it is possible to construct the meter, test it, and drill the shunt after the testing.

Six pins, 32, 33, 34, 35, 36 and 37 project from the prongs of the plug through holes in the base 13, the pins being glass insulated where they pass through the base. The upper ends of the pins are electrically connected to the parts of the meter that are about to be described.

A coil of resistance wire 40 is wound about the mid-portion of the tube 30 and connected at its ends to pins 32 and 33, which are supplied through two of the prongs 11 with electric current sufficient to heat the coil to the desired temperature. The apparatus is preferably operated with a uniform input of electrical energy, producing a uniform input of heat to the portion of the tubing within the coil, but it may be operated at a uniform temperature if desired.

A copper-constantan thermopile of five pairs of junctions is wound about the tubing in a spaced helix with the junctions in contact with the tubing and preferably at equal distances from the heating coil. The thermopile is made up of alternate lengths of copper and constantan wire of about B and S gauge No. 40 wire, the lengths of the alternate sections being approximately the same as the width of the loop so that the five copper-constantan junctions are in contact with one side of the loop and the five constantan-copper junctions are in contact with the other side of the loop. This thermopile is given the number 41 in the drawing and is connected at its ends to pins 36 and 37 which are connected through two of the prongs 11 to an appropriate measuring circuit. The thermopile is insulated from the tube preferably by the use of an insulating varnish.

In order to check the operation of the flowmeter a secondary temperature differential measuring means is provided comprising a single copper wire 70 connected to the left inclined leg of the loop as shown in Fig. 2 and a second single copper wire 71 connected to the tubing of the loop under the coil 40. The wires 70 and 71 are connected through the pins 34 and 35 and prongs 11 of the base member 10 with the measuring circuit in a manner more fully described hereinafter. Since the tubing of the loop is made of constantan, this construction provides two copper-constantan thermocouple junctions, one of which is responsive to the temperature of the loop at the heating element and the other of which is responsive to the temperature of the loop near the base member. These two junctions cooperate to give an indication of the extent to which the gas is heated in passing through the loop.

The model of the flowmeter that has just been described functions as follows: The parts having been assembled, and before the shunt has been drilled, gas of the type which is to be measured by the flowmeter is passed through the inlet, the conduit loop 30 and the outlet. The current is turned on in the heating coil 40, raising the temperature of the tubing within the coil and imparting a temperature rise to the flowing gas. The construction of the loop is such that it does not act as a good conductor of heat and the increase in temperature due to the coil is largely confined to the immediate vicinity of the coil. The flowing gas is heated by the coil and raises the temperature of the conduit beyond the coil in a place but little affected by heat conduction along the conduit wall. This place is indicated on Fig. 2 by the number 45 and an opposite place on the conduit is indicated by the number 46.

About those places on the coil there is wound the thermopile 41 that has been described, with its junctions in contact with the tube. The ends of the thermopile are connected with a suitable measuring circuit which will be briefly described in connection with Fig. 9 and shows the temperature differential between the area 46 of the tube and the area 45. The current generated in the thermopile is related to the temperature differential between points 45 and 46 and may be used in connection with appropriate instruments as a measure of gas flow. A heavy copper cover 75 should be employed to protect the working parts of the meter from external influences, such as changes in temperature, that would otherwise affect its accuracy, becaue the sensitivity of the meter is such that ordinary variations have a considerable effect.

Figure 9:
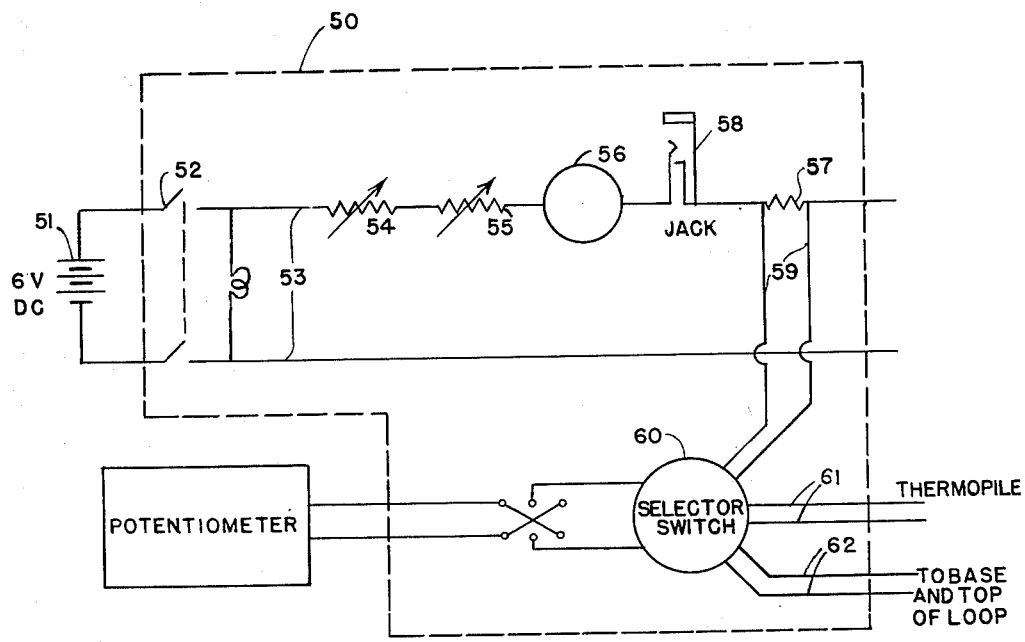
Fig. 9 is a wiring diagram of the flowmeter measuring and heating circuit.

As illustrated in Fig. 9, a measuring circuit in a control box indicated by dotted lines 50 is electrically connected to a 6 volt D. C. battery 51 that is connected by a switch 52 to a heating circuit 53 which includes the heating element 40 of the flowmeter loop. Circuit 53 also contains a pair of rheostats 54 and 55 that provide a fine adjustment of the heating current and a small panel milliammeter 56 having a range from about 0 to 200 milliamperes that provides a rough measurement of the heating current. In cases where a more accurate measurement of the heating current is desired, a more sensitive external milliammeter can be plugged into the jack 58 of circuit 53 to measure the heating current with a high degree of accuracy or alternatively, the heating current may be measured by measuring the IR drop across the resistor 57 which has a resistance of about .005 ohm.

The lower portion of Fig. 9 shows a measuring circuit including a potentiometer and a selector switch 60. The selector switch 60 may be selectively connected through the conductors 59 across the resistance 57 or through the conductors 61 with the thermopile 41 or through the conductors 62 with the wires 70 and 71 comprising the secondary differential temperature measuring means. Thus, the potentiometer may be used to measure the IR drop across the resistance 57 as an indication of the heating current or it may be used to measure the E. M. F. of the thermopile 41 or the E. M. F. of the secondary temperature measuring means 70—71 as an indication of the temperature rise of the gas flowing through the flowmeter loop. As pointed out above, the secondary temperature measuring means is ordinarily used merely to check the operation of the instrument and the thermopile 41 is used for ordinary measurements.

It is important that the heating current be accurately controlled and this current is preferably controlled constant within ½% or less. It will be understood that the foregoing conditions will be varied when different electrical instruments are available, the variations being understood by persons skilled in the art.

Because the specific heats of different gases are different, the meter should be calibrated with the particular gas whose flow is to be measured in operation. The calibration should be carefully done with accurate instruments. Standard methods of accurate calibration such as by means of a plurality of critical-flow orifices are known and may be employed. During calibration the loop should be in the position in which it is to be mounted in use. Figs. 5 to 8 inclusive show various positions in which the loop may be placed.

Figure 5:
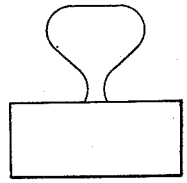
Figs. 5 to 8 are diagrammatic elevation views illustrating various ways of positioning the loop.
Figure 6:
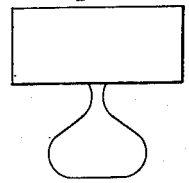
Figure 7:
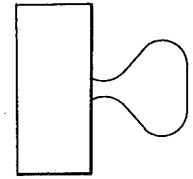
Figure 8:
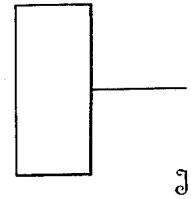

Thus the loop may be mounted above the meter base as shown in Fig. 5, or below the meter base as shown in Fig. 6, or at one side of the meter base and in a vertical plane as shown in Fig. 7, or at one side of the base and in a horizontal plane as shown in Fig. 8. It is a fact that differences in results are observed for different positions of the loop. Therefore if the instrument is calibrated in the preferred upright position, it should be mounted in that position. The shunt should be drilled before calibrating the meter if a shunt is to be used. The flowmeter having a loop without any shunt is useful for flows of about .05 to .2 gram per minute of air or .1 to .4 gram per minute of uranium hexafluoride. By employing a shunt of .295 inch diameter the flowmeter will measure air flows up to about 30 grams per minute or 150 times the capacity of the unshunted meter. For use with the metallic fluoride the heating current used is about 160 milliamperes, which, with a heating coil resistance of 10 ohms, requires about .25 watt at a potential of 1.6 volts.

The modified meter shown in Fig. 3 avoids the difficulty that arises in bending constantan tubing to the rather complex shape shown in Fig. 2, the ends of the tubing being brought straight downward into the base. This form of the meter is otherwise substantially the same as Fig. 2. In Fig. 4 is shown another modification employing a plug mounted in the cover. The modifications of Figs. 3 and 4 are designed for greater flows of gas than the small meter of Fig. 2. In Fig. 4, 80 indicates a plug member, 81 indicate pins projecting therefrom, and 82, 83, etc., indicate the connections from the various pins to the connections which are illustrated in Fig. 2. The position of a shunt conduit, if desired, is shown by dotted lines in Figures 3 and 4.

For accurate results a potentiometer that reads directly to 1 microvolt should be used. A potentiometer should be employed in combination with a galvanometer having a sensitivity of no more than 5 microvolts per millimeter on the scale.

Properly calibrated thermal flowmeters of this novel type give results accurate to within 1 per cent, and it has been shown that a plurality of properly calibrated meters of this type when calibrated in series, agree between themselves better than with the usual calibration system, indicating higher accuracy and greater consistency. When results accurate to 1% are desired it is advisable to control the temperature conditions surrounding the flowmeter to 2° C. or better. When air is used in the meter no variations in meter accuracy greater than 1% in the mass flow rate have been observed between pressures of 1" and 30" of mercury absolute. When the flow rate is suddenly changed by a large amount, equilibrium is attained within two minutes in every case that has been observed. For accuracy of measurement the flow of gas through the meter should be steady and not pulsating.

When calibrated in their place of use, operated under constant conditions, and checked at reasonable intervals, these flowmeters measure mass rate of flow to an accuracy of 1% or better.

By this invention there is provided a fine instrument for the measurement of comparatively small gas flows the capacity of which may be greatly varied by the proper selection of a shunt size.

Since many embodiments might be made of the present invention and since many changes might be made in the embodiment described, it is to be understood that the foregoing description is to be interpreted as illustrative only and not in a limiting sense.

I claim:

1. Apparatus for the measurement of gas flow comprising a massive base member having an inlet and an outlet and formed of a heat conductive material, a loop-shaped conduit of low heat conductivity and low heat capacity operatively connecting the inlet and outlet and arranged to permit the gas flowing therethrough to make thermal contact with said base member near said outlet, a shunt in the base member connecting the inlet and outlet, means to apply to a zone of the conduit a constant input of heat whereby the temperature of gas passing the zone will be raised, means to measure the temperature differential of the conduit between points equidistant from the heated zone, and means to shield the conduit.

2. Apparatus for the measurement of gas flow comprising a massive base member formed of a heat-conductive material, having an inlet and an outlet and having a shunt through the material of the base member connecting the inlet and the outlet, a loop-shaped conduit of low heat conductivity and low heat capacity having thin walls and having its ends operatively connecting the inlet and the outlet and opposite ends of the shunt, said conduit being arranged to permit the gas flowing therethrough to make thermal contact with said base member near said outlet, means to heat a zone of the conduit whereby the temperature of gas passing the zone will be raised, means to measure the temperature differential of the conduit between a point affected by the temperature of the heated gas and a point substantially unaffected thereby, and means to shield the conduit.

3. Apparatus for the measurement of the mass flow of a gas comprising a massive base member formed of a heat-conductive material and having an inlet and an outlet therein, a loop-shaped conduit mounted on one face of said base in communication with said inlet and outlet, an electrical heater outside said conduit supplying heat to a zone of said conduit intermediate said inlet and said outlet, said conduit having a low heat conductivity and a low heat capacity and being arranged to provide thermal contact between the gas flowing therethrough and said base member near said outlet to cool the gas to the base member temperature, electrical temperature measuring means responsive to the temperature difference in said conduit between points on each side of said heated zone, a housing enclosing said conduit and formed partly by said base and electrical connector members mounted on said housing and electrically connected through said housing to said heating means and said temperature measuring means.

4. Apparatus for the measurement of the mass flow of a gas comprising a massive base member formed of a heat-conductive material and having an inlet and an outlet therein, a shunt conduit formed in said base between said inlet and said outlet, a loop-shaped conduit mounted on one face of said base in communication with said inlet and said outlet at opposite ends of said shunt conduit, an electrical heater outside said loop-shaped conduit supplying heat to a zone of said conduit intermediate said inlet and said outlet, said loop-shaped conduit having a low heat conductivity and a low heat capacity and arranged to provide thermal contact between the gas flowing therethrough and said base member near said outlet to return the gas to the base member temperature, electrical temperature measuring means responsive to the temperatures of said loop-shaped conduit at points on each side of said heated zone, a housing enclosing said loop-shaped conduit and partly formed by said base and electrical connector members mounted on said housing and electrically connected through said housing to said heating and said temperature measuring means.

5. Apparatus for the measurement of the mass flow of a gas comprising a massive base member formed of a heat-conductive material and having an inlet and an outlet therein, a loop-shaped conduit mounted on one face of said base in communication with said inlet and said outlet, an electrical heater outside said conduit supplying heat to a zone of said conduit intermediate said inlet and said outlet, said conduit having a low heat conductivity and a low heat capacity and arranged to provide thermal contact between the gas flowing therethrough and said base member near said outlet to cool the heated gas to the base member temperature, electrical temperature measuring means responsive to the temperature difference in said conduit between points equidistant from the heated zone, a housing enclosing said conduit and formed partly by said base and electrical connector members mounted on said base and electrically connected through said base with said heating means and said temperature measuring means.

6. Apparatus for the measurement of the mass flow of a gas comprising a massive, generally cylindrical base formed of a heat-conductive material having an inlet and an outlet therein opposite one another, a shunt conduit formed in said base interconnecting said inlet and said outlet, a loop-shaped conduit mounted on one flat face of said base and communicating with said inlet and said outlet at opposite ends of said shunt conduit, an electrical resistance heater outside said loop-shaped conduit supplying heat to a zone thereof intermediate said inlet and said outlet, said loop-shaped conduit having a low heat conductivity and a low heat capacity and arranged to provide thermal contact between the gas flowing therethrough and said base near said outlet to return the gas to the temperature of said base, a plurality of thermocouples having their hot and their cold junctions in contact with said loop-shaped conduit at points equidistant from opposite ends of said heated zone, a plurality of electrical connector members mounted on the face of said base opposite said loop-shaped conduit and electrically connected through said base to said heater and said thermocouples and a housing enclosing said conduit and formed partly by said base.

EUGENE T. BOOTH, Jr.

REFERENCES CITED

The following references are of record in the file of this patent:

UNITED STATES PATENTS

| Number | Name | Date |
| --- | --- | --- |
| 2,016,660 | Weeles | Oct. 8, 1935 |

FOREIGN PATENTS

| Number | Country | Date |
| --- | --- | --- |
| 245,150 | Germany | Mar. 28, 1912 |
| 110,053 | Great Britain | Oct. 11, 1917 |
| 312,522 | Germany | May 28, 1919 |
| 131,375 | Great Britain | Aug. 28, 1919 |
| 799,747 | France | Apr. 11, 1936 |